United States Patent
Hallnor et al.

(10) Patent No.: US 8,090,967 B2
(45) Date of Patent: Jan. 3, 2012

(54) POWER STATE TRANSITION INITIATION CONTROL OF MEMORY INTERCONNECT BASED ON EARLY WARNING SIGNAL, MEMORY RESPONSE TIME, AND WAKEUP DELAY

(75) Inventors: Erik G. Hallnor, Beaverton, OR (US); Zhen Fang, Portland, OR (US); Hemant G. Rotithor, Hillboro, OR (US)

(73) Assignee: Intel Corporation, Santa Clara, CA (US)

( * ) Notice: Subject to any disclaimer, the term of this patent is extended or adjusted under 35 U.S.C. 154(b) by 711 days.

(21) Appl. No.: 12/126,540

(22) Filed: May 23, 2008

(65) Prior Publication Data

US 2009/0292935 A1 Nov. 26, 2009

(51) Int. Cl.
*G06F 1/32* (2006.01)
(52) U.S. Cl. ........................ 713/323; 713/401
(58) Field of Classification Search ............... None
See application file for complete search history.

(56) References Cited

U.S. PATENT DOCUMENTS

| 6,009,488 A | 12/1999 | Kavipurapu | |
|---|---|---|---|
| 6,128,747 A * | 10/2000 | Thoulon | 713/330 |
| 2003/0135676 A1* | 7/2003 | Jensen | 710/107 |
| 2006/0206737 A1* | 9/2006 | Lee | 713/320 |

FOREIGN PATENT DOCUMENTS

| EP | 1 684 188 | 7/2006 |
|---|---|---|
| JP | 2006-201909 | 8/2006 |

OTHER PUBLICATIONS

PCI Express; "PCI Express Base Specification Revision 2.0"; Dec. 20, 2006; pp. 1-608.
State Intellectual Property Office, P.R. China, First Office Action issued Jan. 12, 2011 in Chinese application No. 200910146522.1.
Japanese Patent Office, Notice of Reasons for Rejection mailed Jul. 12, 2011 in Japanese application No. 2009-119136.

* cited by examiner

*Primary Examiner* — Kenneth Kim
(74) *Attorney, Agent, or Firm* — Trop, Pruner & Hu, P.C.

(57) ABSTRACT

A proposal for power management control of an interconnect structure based on power state transition control. The power state transition is based on generating early warning signals and an idle timeout value setting based on response time and detection of subsequent requests.

19 Claims, 5 Drawing Sheets

US 8,090,967 B2

POWER STATE TRANSITION INITIATION CONTROL OF MEMORY INTERCONNECT BASED ON EARLY WARNING SIGNAL, MEMORY RESPONSE TIME, AND WAKEUP DELAY

FIELD

Embodiments of the invention relate to the field of partitioning, and according to one embodiment, a method and apparatus, and system for power management of a link interconnect.

GENERAL BACKGROUND

Power management schemes allow for reducing power consumption for various types of systems and integrated devices, such as, servers, laptops, processors and desktops. With the introduction of processors with multiple cores, power management becomes a major concern because of the increase in cores operating at high frequencies and voltages and need to adhere to various power constraints, such as, thermal limits, maximum current, and Vcc range.

A link interconnect allows communication between devices and functional blocks. Some examples of interconnects are shared buses and point to point links. The links may be in different power states depending on the traffic and each state allows different level of power and performance tradeoff. A link may be transitioned to a low power state when there is no traffic on the link and such a condition is typically sensed via an idle timeout mechanism, that is, if there is no link traffic for a preset interval of time, the link is transitioned to a low power state. A small value of idle link timeout allows link to transition to low power state more often thus increasing power savings, however, to come out of low power state there is a penalty to wake the link up that costs in terms of performance. On the other hand a larger idle timeout minimizes this performance penalty but the link goes into low power state less often, reducing the power savings.

BRIEF DESCRIPTION OF THE DRAWINGS

The invention may best be understood by referring to the following description and accompanying drawings that are used to illustrate embodiments of the invention.

DETAILED DESCRIPTION

Figure 1:
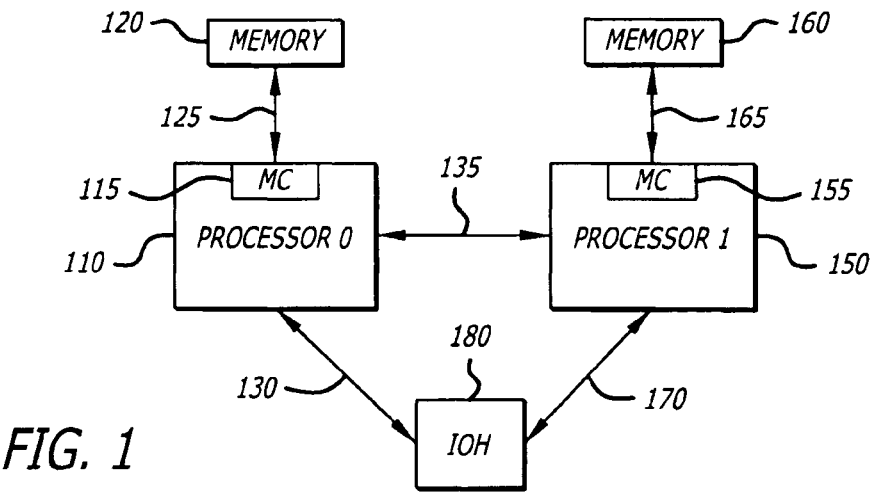
FIG. 1 is an exemplary block diagram of a dual processor system in accordance with an embodiment of the invention.

In the following description, certain terminology is used to describe features of the invention. For example, the term "device" or "agent" is general and may be used to describe any electrical component coupled to a link. A "link or interconnect" is generally defined as an information-carrying medium that establishes a communication pathway for messages, namely information placed in a predetermined format. The link or interconnect may be a wired physical medium (e.g., a bus, one or more electrical wires, trace, cable, etc.) or a wireless medium (e.g., air in combination with wireless signaling technology).

In one embodiment, the claimed subject matter allows using an aggressive idle timeout value to transition into low link power state while minimizing the latency to transactions that wake the links up from a low power state. In one aspect, the claimed subject matter optimizes power and performance tradeoff.

The term "home agent" is broadly defined as a device that provides resources for a caching agent to access memory and, based on requests from the caching agents, can resolve conflicts, maintain ordering and the like. The home agent includes a tracker and data buffer(s) for each caching agent as described below. A "tracker" is dedicated storage for memory requests from a particular device. For instance, a first tracker may include a plurality of entries associated with a first caching agent while a second tracker may include other entries associated with a second caching agent. According to one embodiment of the invention, the "caching agent" is generally a cache controller that is adapted to route memory requests to the home agent.

The term "logic" is generally defined as hardware and/or software that perform one or more operations such as controlling the exchange of messages between devices. When deployed in software, such software may be executable code such as an application, a routine or even one or more instructions. Software may be stored in any type of memory, normally suitable storage medium such as (i) any type of disk including floppy disks, magneto-optical disks and optical disks such as compact disk read-only memories (CD-ROMs), compact disk rewritables (CD-RWs), digital versatile disks (DVDs), (ii) any type of semiconductor devices such as read-only memories (ROMs), random access memories (RAMs), erasable programmable read-only memories (EPROMs), flash memories, electrically erasable programmable read-only memories (EEPROMs), (iii) magnetic or optical cards, or (iv) any other type of media suitable for storing electronic instructions.

In the following description, numerous specific details are set forth. However, it is understood that embodiments of the invention may be practiced without these specific details. In other instances, well-known circuits, structures and techniques have not been shown in detail in order not to obscure the understanding of this description.

As discussed earlier, a link interconnect allows communication between devices and functional blocks. Some examples of interconnects are shared buses and point to point interconnects. The links may be in different power states depending on the traffic and each state allows different level of power and performance tradeoff. A link may be transitioned to a low power state when there is no traffic on the link and such a condition is typically sensed via an idle timeout mechanism, that is, if there is no link traffic for a preset interval of time, the link is transitioned to a low power state. A small value of idle link timeout allows link to transition to low power state more often thus increasing power savings, however, to come out of low power state there is a penalty to wake the link up that costs in terms of performance. On the other hand a larger idle timeout minimizes this performance penalty but the link goes into low power state less often, reducing the power savings. In one aspect, the proposed invention allows using an aggressive idle timeout value to transition into low link power state while minimizing the latency to transactions that wake the links up from a low power state thereby optimizing power and performance tradeoff.

Each power state offers a different level of power and performance tradeoff. For example, a normal full power state, such as, a L0 state, offers a higher level of performance with more link power utilization than a lower power state, such as, L0s or L1 but dissipates more power. In contrast, the lower power states offer improved power with a corresponding reduction in performance. In the event the link is idle or only intermittently communicating packets or data, it is beneficial to change the power state from a normal power state to a lower power state. In light of the power performance savings, one needs to incur the latency penalty associated with transitioning back to the normal power state upon more activity on the link.

In one embodiment, the L1 state, disables all clocks (PLLS), the transmitter and receiver. In another embodiment, the L0s state, allows for the clocks to be enabled while the transmitter and receiver power is switched off and clocks are disabled. Keeping clocks enabled allows the link to quickly come out of L0s state, thus paying a smaller latency to transactions when coming out of L0s state to L0 state.

The claimed subject matter facilitates control of the transition between the power states previously discussed. In one embodiment, the control logic for the power state transition is depicted in a processor. In one embodiment, the control logic for the power state transition is depicted in a memory controller hub (MCH). In one embodiment, the control logic for the power state transition is depicted in an input/output hub (IOH). In one embodiment, the control logic for the power state transition is depicted in a memory controller (MC).

In one embodiment, the power state transition is utilized for a point to point interconnect, such as, PCIe (Peripheral Component Interconnect), Quickpath or CSI, etc. In another embodiment, the power state transition is utilized for a shared bus interconnect.

I. Exemplary System Architecture

Referring to FIG. 1, an exemplary block diagram of a system in accordance with one embodiment of the invention is shown. Herein, FIG. 1 depicts a dual processor (DP) configuration with processors 110 and 150. For instance, this configuration may be associated with a desktop or mobile computer, a server, a set-top box, personal digital assistant (PDA), alphanumeric pager, cellular telephone, or any other type of wired or wireless communication devices.

Each processor 110 and 150 includes a memory controller (MC) 115 and 155 to enable direct communications with an associated memory 120 and 160 via links 125 and 165, respectively. Moreover, the memories 120 and 160 may be independent memories or portions of the same shared memory.

As specifically shown in FIG. 1, processors 110 and 150 are coupled to an input/output hub (IOH) 180 via point-to-point links 130 and 170, respectively. IOH 180 provides connectivity between processors 110 and 150 and input/output (I/O) devices implemented within DP system 100. In addition, processors 110 and 150 are coupled to each other via a point-to-point link 135. According to one embodiment of the invention, these point-to-point links 130, 135, 170 may be adapted to operate in accordance with "Quickpath" specification developed by Intel Corporation of Santa Clara, Calif. However, the claimed subject matter is not limited to a Quickpath link and may utilize any type of link or interconnect. One skilled in the art appreciates the utilization of any link or interconnect scheme that is customized for the particular design requirements. For example, one may use any coherent or non coherent link or interconnect protocol, such as, but not limited to Peripheral Component Interconnect (PCI, PCIe, etc.), a front side bus (FSB), etc.

Figure 2:
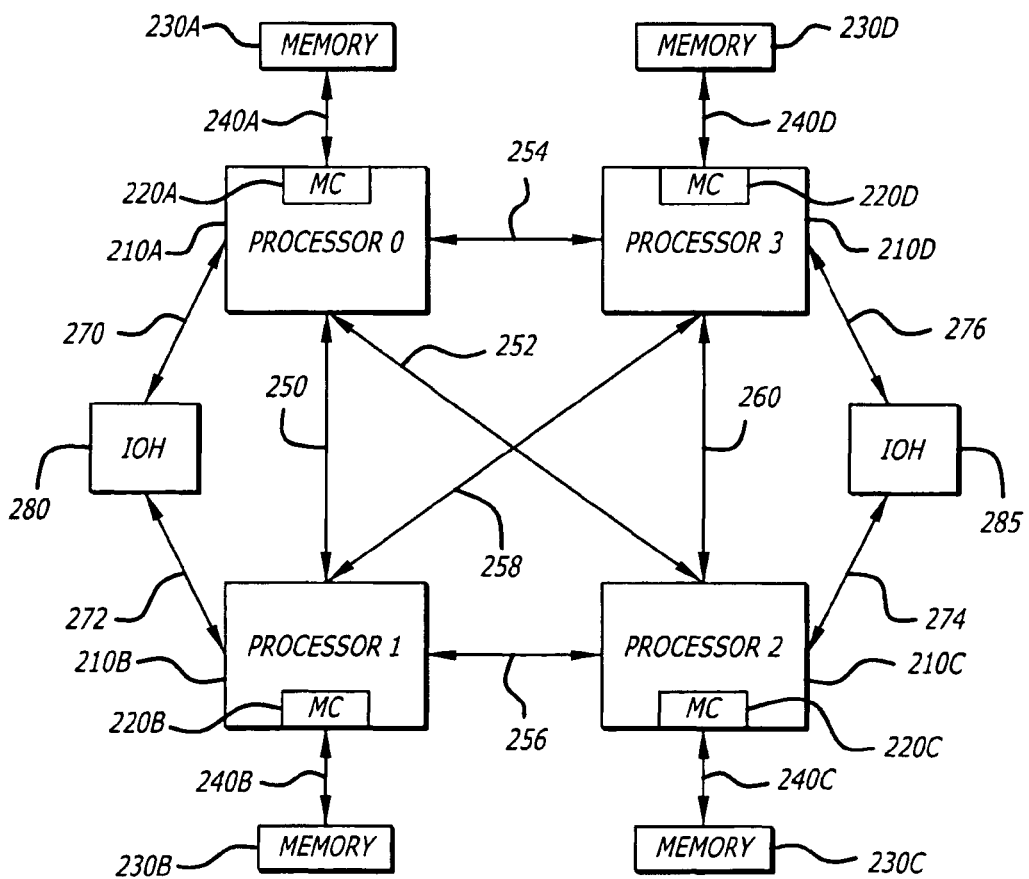
FIG. 2 is an exemplary block diagram of a multi-processor system in accordance with an embodiment of the invention.

Referring now to FIG. 2, an exemplary block diagram of a multiprocessor (MP) system in accordance with one embodiment of the invention is shown. Similarly, MP system may be a desktop or mobile computer, a server, a set-top box, personal digital assistant (PDA), alphanumeric pager, cellular telephone, or any other type of wired or wireless communication devices.

Herein, according to one embodiment of the invention, MP system comprises a plurality of processors 210A-210D. One or more of processors, such as processors 210A-210D, may include a memory controller (MC) 220A-220D. These memory controllers 220A-220D enable direct communications with associated memories 230A-230D via links 240A-240D, respectively. In particular, as shown in FIG. 2, processor 210A is coupled to memory 230A via a link 240A while processors 210B-210D are coupled to corresponding memories 230B-230D via links 240B-240D, respectively.

Additionally, processor 210A is coupled to each of the other processors 210B-210D via pTp (point-to-point) links 250, 252 and 254. Similarly, processor 210B is coupled to processors 210A, 210C and 210D via pTp links 250, 256 and 258. Processor 210C is coupled to processors 210A, 210B and 210D via pTp links 252, 256 and 260. Processor 210D is coupled to processors 210A, 210B and 210C via pTp links 254, 258 and 260. Processors 210A and 210B are coupled via pTp interconnects 270 and 272 to a first input/output hub (IOH) 280 while processors 210C and 210D are coupled via point-to-point interconnects 274 and 276 to a second IOH 285.

For both systems 100 and 200 described in FIGS. 1 and 2, it is contemplated that the processors may be adapted to operate as a home agent, a caching agent or both, depending on the system architecture selected.

Figure 3:
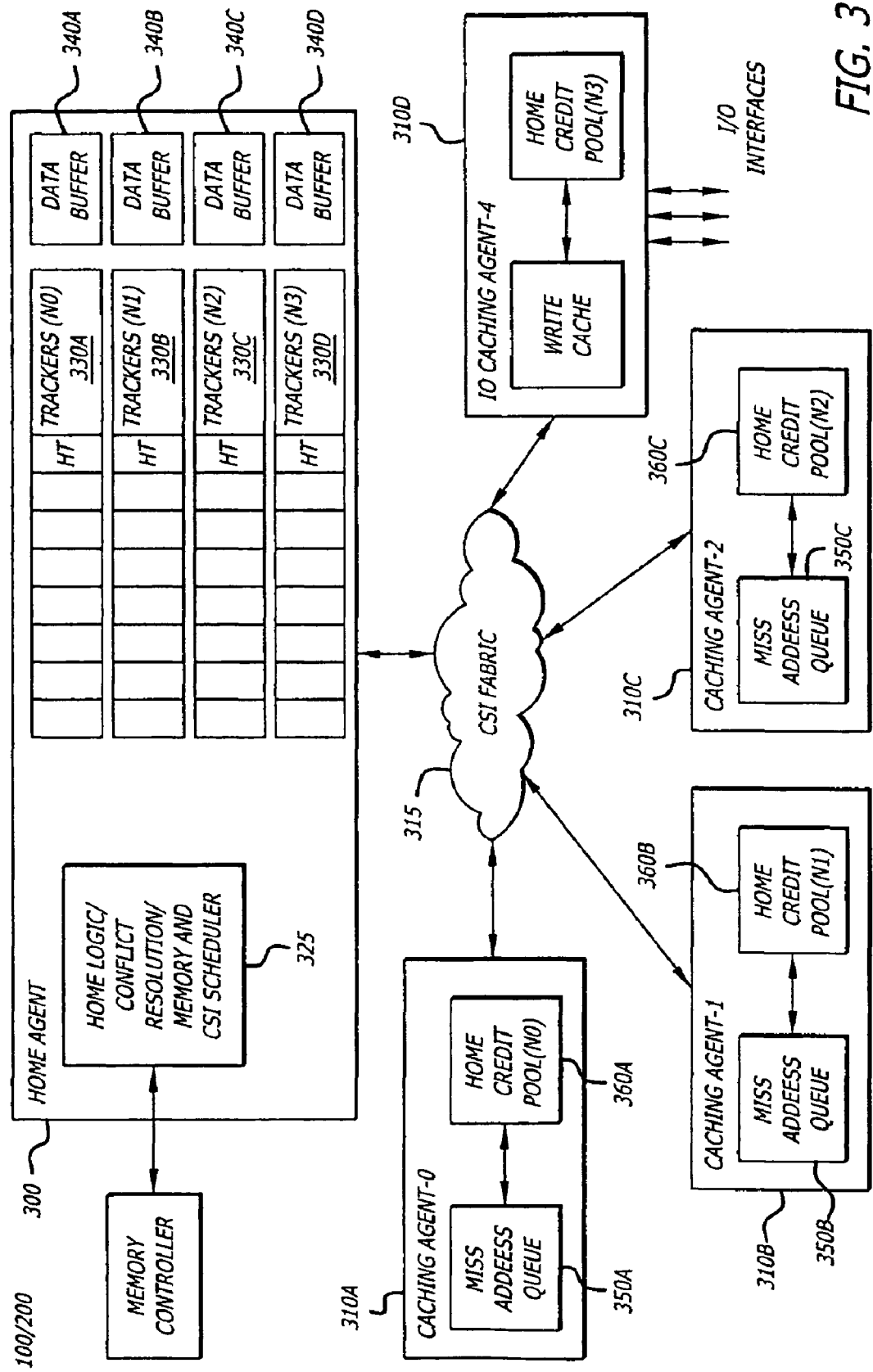
FIG. 3 is an exemplary embodiment of architectures for home and caching agents of the systems of FIGS. 1-2 in accordance with an embodiment of the invention.

Referring now to FIG. 3, an exemplary embodiment of architectures for destination and source devices of the systems of FIGS. 1-2 in accordance with an embodiment of the invention is shown. For illustrative purposes, processor 210D from FIG. 2 (or processor 150 from FIG. 1) is configured as a destination device 300, such as a home agent for example. Processors 210A-210C from FIG. 2 (or processor 110 from FIG. 1) could be configured as sources 310A-310C, such as caching agents for example. IOH 280 or 285 (or IOH 180 of FIG. 1) may be configured as I/O device 310D implementing a write cache 320 operates as a caching agent as well.

As described below, each source 310A, . . . , or 310D is associated with a tracker that is maintained at destination device 300 and has a predetermined number of tracker entries. The number of tracker entries is limited in size to the number of requests that may be transmitted by any source 310A, . . . , or 310D that saturates the bandwidth of a PTP fabric 315, which supports point-to-point communications between destination 300 and the plurality of sources (e.g., sources 310A-310D).

As shown in FIG. 3, according to this embodiment of the invention, destination 300 is a home agent that comprises home logic 325 and a plurality of trackers 330A . . . 330B. In combination with trackers, home logic 325 is adapted to operate as a scheduler to assist in the data transfer of incoming information from memory 230A of FIG. 2 and outgoing information to PTP fabric 315. Moreover, home logic 325 operates to resolve conflicts between these data transfers.

Herein, for this embodiment of the invention, since four (4) caching agents 310A-310D are implemented within system 100/200, four (M=4) trackers are illustrated and labeled "HT- 0" 330A, "HT-1" 330B, "HT-2" 330C and "HT-3" 330D. These trackers 330A-330D each contain N0, N1, N2 and N3 tracker entries respectively, where Ni≧1 (i=1, 2, 3 or 4). The number of entries (N0-N3) may differ from one tracker to another. Associated with each entry of trackers 330A-330D is a corresponding data buffer represented by data buffers 340A-340D. Data buffers 340A-340D provide temporary storage for data returned from memory controller 220A, and eventually scheduled onto PTP fabric 315 for transmission to a targeted destination. The activation and deactivation of the entries for trackers 330A-330D is controlled by home logic 325 described below.

Caching agents 310A, 310B, and 310C include a miss address queue 350A, 350B, and 350C, respectively. For instance, with respect to caching agent 310A, miss address queue 350A is configured to store all of the miss transactions that are handled by home agent 300 that are tracked in 330A.

In addition, according to this embodiment of the invention, caching agents 310A, 310B and 310C further include a credit counter 360A, 360B and 360C, respectively. Each credit counter 360A, 360B, and 360C maintains a count value representative of the number of unused tracker entries in trackers 330A, 330B, and 330C. For instance, when a new transaction is issued by caching agent 310A to home agent 300, credit counter 360A is decremented. If a transaction completes, then credit counter 360A is incremented. At reset time, credit counter 360A is initialized to the pool size equal to the number of tracker entries (N0) associated with tracker 330A. The same configuration is applicable to credit counters 360B-360C.

Also shown in FIG. 3 is an example of caching agent 310D operating as an I/O agent that reads information from memory and writes information to an I/O interface. Alternately, caching agent 310D may stream I/O agent read returns as writes into the main memory. Caching agent 310D implements write cache 320, which is used to sustain high bandwidth while storing data associated with I/O operations.

Figure 4:
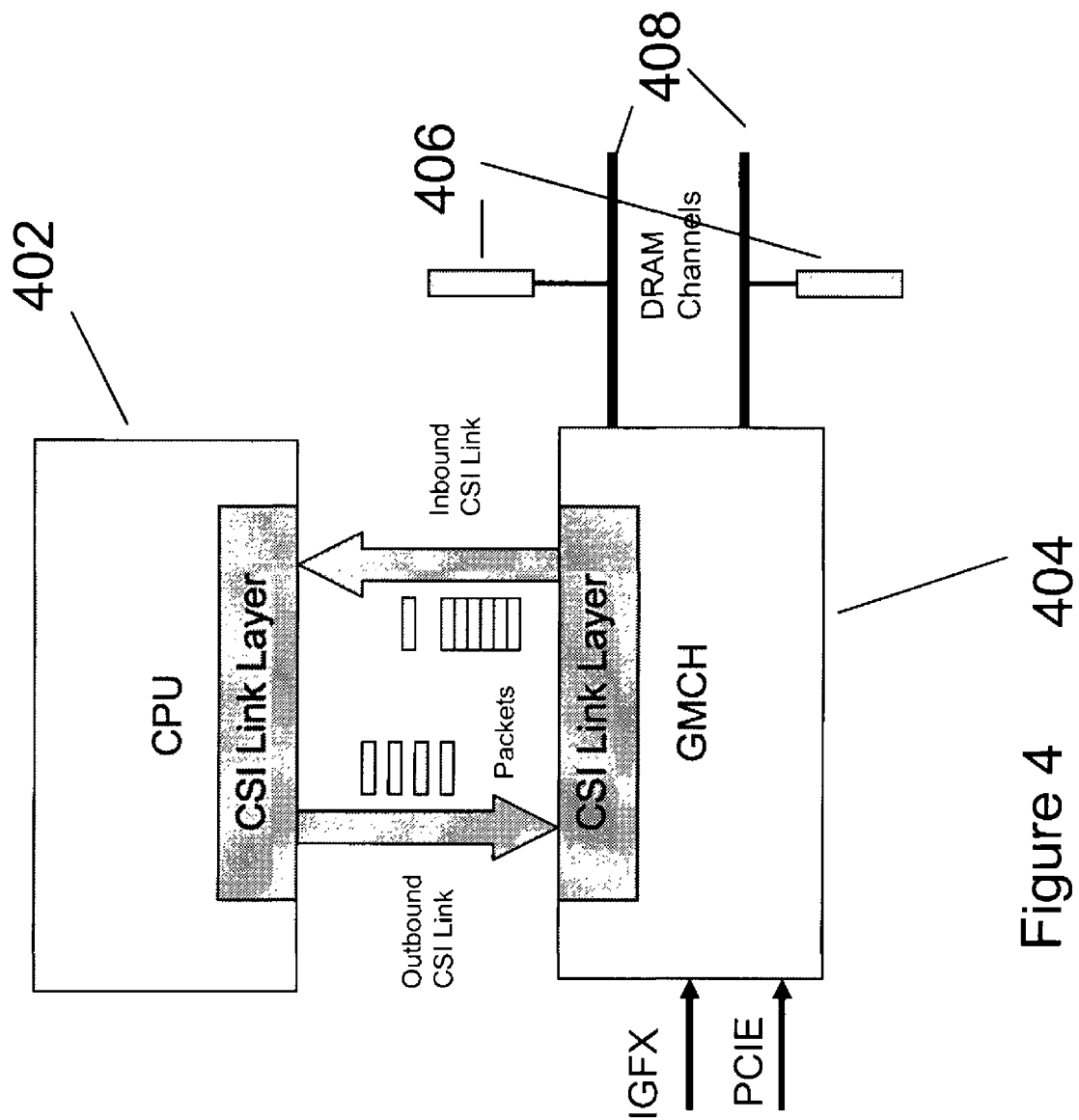
FIG. 4 is a block diagram of a system in accordance with an embodiment of the invention.

FIG. 4 is a block diagram of a system in accordance with an embodiment of the invention. In this embodiment, a CPU 402 sends requests in a packet format to MCH 404 via point to point interconnect links. In this direction, the packets are outbound, away from the processor. In response, the MCH sends data or information from a memory or other integrated devices via point to point interconnects in an inbound direction. In one embodiment, the memory is DRAM (Dynamic Random Access Memory). Also, the MCH receives other information, such as, Integrated Graphics (IGFX), and data from PCIe interconnects. In one embodiment, the point to point interconnect between the CPU and MCH are Quickpath or CSI links that incorporate a multi layer protocol that includes a link layer to facilitate formation of the packets.

Figure 5:
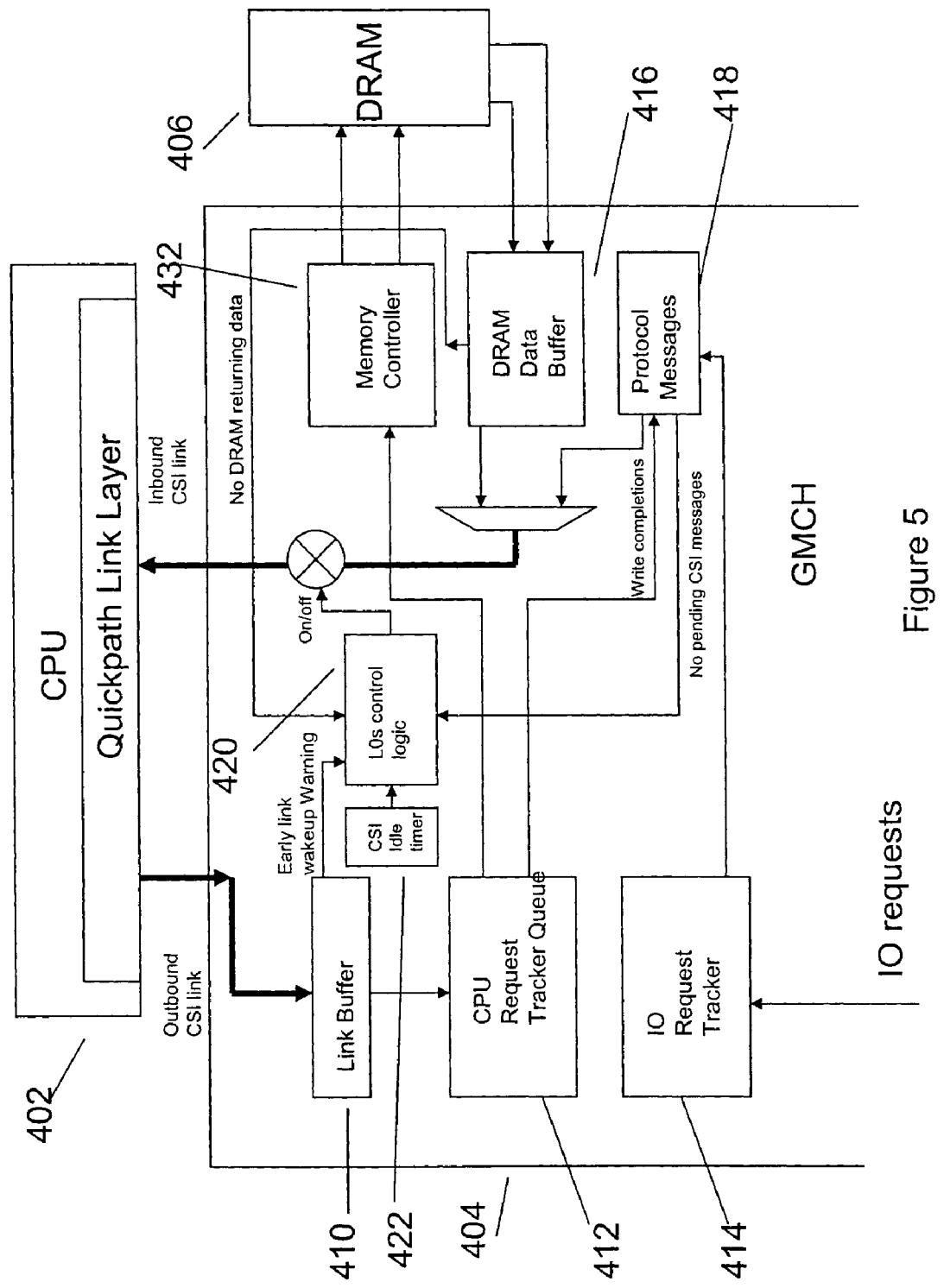
FIG. 5 is an apparatus in accordance with an embodiment of the invention.

FIG. 5 is an apparatus in accordance with an embodiment of the invention. In this embodiment, the apparatus is a MCH. In another embodiment, the logic blocks depicted in this figure may be also utilized in a CPU, hence, the CPU may directly communicate with a IOH or memory and not include a MCH.

As discussed earlier, the CPU 402 issues requests to the MCH 404 according to a messaging protocol. In one embodiment, the messaging protocol is a request-response protocol, that is, for all request transactions sent, there is a response packet sent after an interval. The interval between the request and response varies depending on the type of the request and the response that needs to be computed. For example, after a read request is sent to the MCH, the read data packet is sent as a response after the data is read from the DRAM and can take variable amount of time depending on the address and DRAM page table state. Another example is a write request to a DRAM for which a completion response is sent after all the coherency checks are done.

In this embodiment, the packets from CPU are received on outbound link into a link buffer 410. Subsequently, these are decoded and allocated to CPU request trackers 412. The requests are then sent to memory controller 432 where they look up the DRAM 406 for reads and write data to DRAM 406 for writes. The read return data from DRAM goes to a DRAM buffer 416 where it is arbitrated with other packets to use the inbound link. Other packets can be IO snoop requests and write completions etc. The IO requests are allocated in an IO request tracker 414. The inbound link is controlled by power control logic 420, which causes the transition of the link into L0 and L0s states based on transactions in the system and state.

As discussed earlier, performance is adversely impacted because sleeping links are woken up in an on-demand fashion. Consequently, the message that wakes the link up is exposed to full L0s exit latency, for a read transaction, when data starts returning from the DRAM or when a write completion packet is arbitrated to be sent on the inbound link. The latency to wake the link up is due to electrical delays for bringing links up from low power state to a high power state. In contrast, the claimed subject matter utilizes a response computation delay after a request is seen in the MCH. In one aspect, the claimed subject matter facilitates generating an early warning (EW) signal to the inbound link. Therefore, starting the transition from L0s to L0 results in decreasing the delay seen by the response message. The generation of the early warning signal is depicted in connection with FIG. 6. In another embodiment, an opportunistic powerdown is discussed in connection with FIG. 6. Furthermore, in another embodiment, the claimed subject matter further allows for opportunistic powerdown in addition to the early warning signal to further enhance the power and performance tradeoff.

Figure 6:
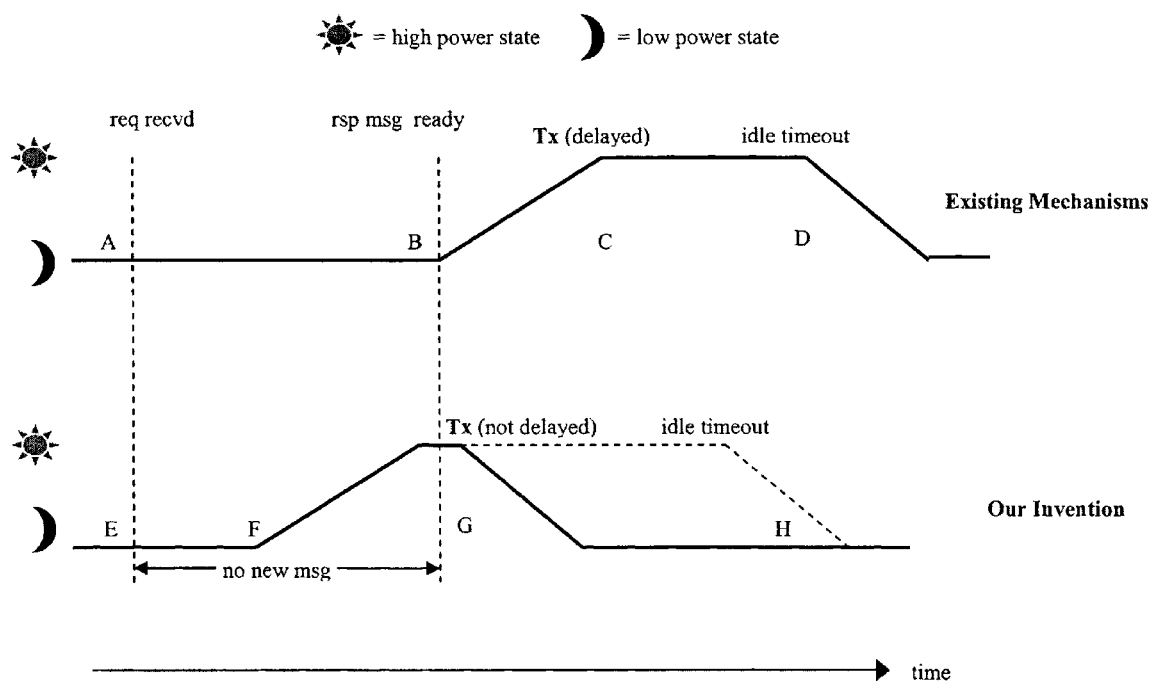
FIG. 6 is a timing diagram in accordance with an embodiment of the invention.

FIG. 6 is a timing diagram in accordance with an embodiment of the invention. The top timing diagram represents the prior art. In contrast, in one embodiment, the lower waveform depicts the timing for issuing the early warning (EW) signal that initiates the transition of the power state of a link to a L0 state.

The prior art waveform illustrates a request being received by memory controller hub at point A. At point B, the response is ready to be sent on the inbound link, which presently is in the L0s power state. The link starts the transition to L0 delaying the transmission of the response until point C.

In contrast, the claimed subject matter, represented in the lower waveform, sends the EW signal when the request arrives at point E. This signal causes the inbound link to begin the transition to L0 early, so that when the response is ready it is immediately sent at point G. This helps overlap link wakeup latency with response computation for the transaction that wakes the link up and reduces latency to sending response for that transaction.

In another embodiment, the idle timeout value is set based at least in part on comparing the difference between EW and response ready. For example, if the time between the EW signal and the response becoming ready is always greater than the L0s to L0 transition time, the proposed scheme removes all performance penalties of L0s on link wakeup. Therefore, this allows the idle timeout to be set very aggressively and causes the inbound link to spend most of its time in L0s with little performance impact.

In yet another embodiment, the L0s to L0 power state transition for the inbound link is delayed if the interval between the EW signal and the response becoming ready is very much greater than the L0s to L0 transition time. For example, in one embodiment, the L0s exit time is order of ~30 ns; for a page miss transaction, the request to response time could be ~50 ns. Therefore, if the response time is greater than L0s exit time by more than say few ns, such as, but not limited to 5 ns. In this case, we can delay the start of the link state transition until some time after the EW signal arrives. This allows keeping link in low power state as long as possible thereby saving power and also minimizing the latency to response optimizing performance. In the figure above this is represented by the delay between receiving the EW at E and starting the transition at point F so the link completes the transition just in time to send the response. However, the claimed subject matter is not limited to the previous values. For example, the page miss transaction time depends on the type of memory and memory architecture.

As described above, the link needs to be idle for some amount of time (idle timeout) before returning to the L0s state. In yet another embodiment, one can opportunistically return the inbound link to L0s state after the current transmission if no additional requests have arrived in the interim. For example, when the inbound link is in L0s power state and a request is received at point E, a flag is set indicating an initial request has arrived. However, any subsequent response clears this flag. If the flag is still set at point G, this indicates the absence of any subsequent requests. Consequently, there is an absence of any responses to be transmitted. Therefore, one can transition the link immediately to the L0s state. In contrast, if the flag is cleared, then a response will be coming soon after the current one response. Therefore, one needs to wait for the normal idle timeout to move the inbound link back to L0s state. This helps transition link to low power state and maximize link sleep time when we have sporadic single requests waking the link up; If we don't do this, we would stay in L0 power state for the period of link idle timeout until we sense the link idle before transitioning it to L0s state again.

Also, the claimed subject matter may be implemented in software. For example, the software may be stored in an electronically-accessible medium that includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

While the invention has been described in terms of several embodiments of the invention, those of ordinary skill in the art will recognize that the invention is not limited to the embodiments of the invention described, but can be practiced with modification and alteration within the spirit and scope of the appended claims. The description is thus to be regarded as illustrative instead of limiting.

What is claimed is:

1. A method for managing power states for an interconnect to couple a processor to a memory comprising:
   generating an early warning signal upon receiving a request, in a memory controller, from the processor and transmitting the early warning signal to a control logic that controls the interconnect, wherein the early warning signal initiates a power state transition for the interconnect from a first power state to a second power state;
   decoding in the memory controller whether the request is a read or write operation and sending the request to the memory;
   transitioning the interconnect from the first power state to the second power state when the request is a write operation using the early warning signal to enable transmission of a completion response to the processor, otherwise, transitioning the interconnect from the first power state to the second power state based on comparison of a delay of a difference between the early warning signal and a response to the read operation from a memory with respect to a wakeup delay associated with the transition from the first power state to the second power state, the first power state a lower power state than the second power state.

2. The method of claim 1 wherein the first power state consumes less power than the second power state.

3. The method of claim 1 wherein the first power state is a L0s state and the second power state is a L0 state.

4. The method of claim 1 wherein the memory is a Dynamic Random Access Memory (DRAM).

5. The method of claim 1 wherein the memory controller comprises a memory controller hub.

6. The method of claim 1 further comprising receiving the request via a point-to-point interconnect.

7. The method of claim 1 further comprising sending the completion response to the processor after performing a coherency check.

8. The method of claim 7 wherein the early warning signal enables overlap of a wakeup latency with completion of the completion response.

9. The method of claim 7 wherein the delay is set such that the interconnect transitions from the first power state to the second power state in sufficient time to send the completion response.

10. The method of claim 1 further comprising setting a flag to indicate receipt of the request and enabling the interconnect to re-enter the first power state after sending the response if the flag remains set.

11. The method of claim 10 further comprising clearing the flag to indicate receipt of a second request, and waiting for an idle timeout window before re-entering the second power state.

12. A system comprising:
    a processor, to generate a request and to send the request to an interconnect control logic;
    a memory, coupled to the processor, to receive the request via an interconnect structure;
    the interconnect structure to connect the processor to the memory;
    the interconnect control logic to generate an early warning signal upon receipt of the request from the processor, wherein the early warning signal initiates a power state transition for the interconnect structure from a first power state to a second power state, to set an idle timeout value for the interconnect structure based on a comparison of a difference in time between the generation of the early warning signal and receipt of a response to the request to a transition time from the first power state to the second power state of the interconnect structure, the first power state lower than the second power state.

13. The system of claim 12 wherein the memory is a DRAM.

14. The system of claim 12 wherein the interconnect control logic resides in the processor.

15. The system of claim 12 wherein the interconnect control logic resides in a chipset, coupled to the processor.

16. An integrated device to manage power states for an interconnect that couples a processor and an integrated device comprising:

a buffer to store a plurality of packets received from the interconnect;

a request tracker queue, coupled to the buffer, to store a decoded version of the received packets, the decoded version including a request to be processed by a memory coupled to the integrated device; and an interconnect control logic to generate an early warning signal upon receipt of the request, wherein the early warning signal initiates a power state transition for the interconnect from a first power state to a second power state, to set an idle timeout value for the interconnect based on a comparison of a difference in time between the generation of the early warning signal and receipt of a response to the request to a transition time from the first power state to the second power state of the interconnect, the first power state lower than the second power state.

17. The integrated device of claim 16 wherein the integrated device is a memory controller hub (MCH).

18. The integrated device of claim 16 wherein the memory is a DRAM.

19. The integrated device of claim 16 wherein the integrated device is a processor.

* * * * *